United States Patent [19]
Goto et al.

[11] 4,057,691
[45] Nov. 8, 1977

[54] SWITCHING NETWORK WITH CROSSTALK ELIMINATION CAPABILITY

[75] Inventors: Hirokazu Goto; Kunio Nagashima, both of Tokyo, Japan

[73] Assignee: Nippon Electric Company, Ltd., Tokyo, Japan

[21] Appl. No.: 699,131

[22] Filed: June 23, 1976

[30] Foreign Application Priority Data

June 24, 1975 Japan .................................. 50-78936
Dec. 24, 1975 Japan .................................. 50-155411
Dec. 24, 1975 Japan .................................. 50-155412

[51] Int. Cl.² ............................................ H04Q 3/52
[52] U.S. Cl. ................................................ 179/18 GF
[58] Field of Search .................... 179/18 GE, 18 GF; 340/166 R

[56] References Cited

U.S. PATENT DOCUMENTS 3,892,925 7/1975 Fisk et al. ...................... 179/18 GF Primary Examiner—Thomas A. Robinson
Attorney, Agent, or Firm—Sughrue, Rothwell, Mion, Zinn and Macpeak

[57] ABSTRACT

A switching network with crosstalk elimination capability comprises a group of incoming lines connected to subscribers, a group of outgoing lines intersecting the incoming line group, and a plurality of switching elements provided at preselected crosspoints formed between the incoming lines and the outgoing lines. Crosstalk elimination is provided by means for grounding idle and unused incoming lines and/or idle and unused outgoing lines through impedance elements having a sufficiently low impedance value at a desired frequency band of signals to be exchanged.

6 Claims, 13 Drawing Figures

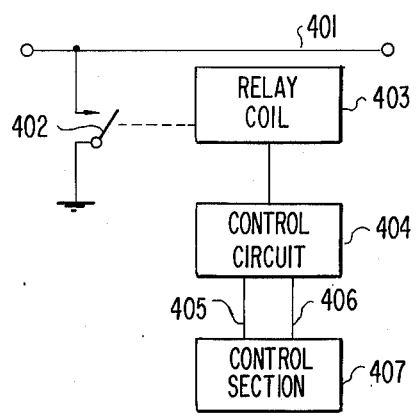
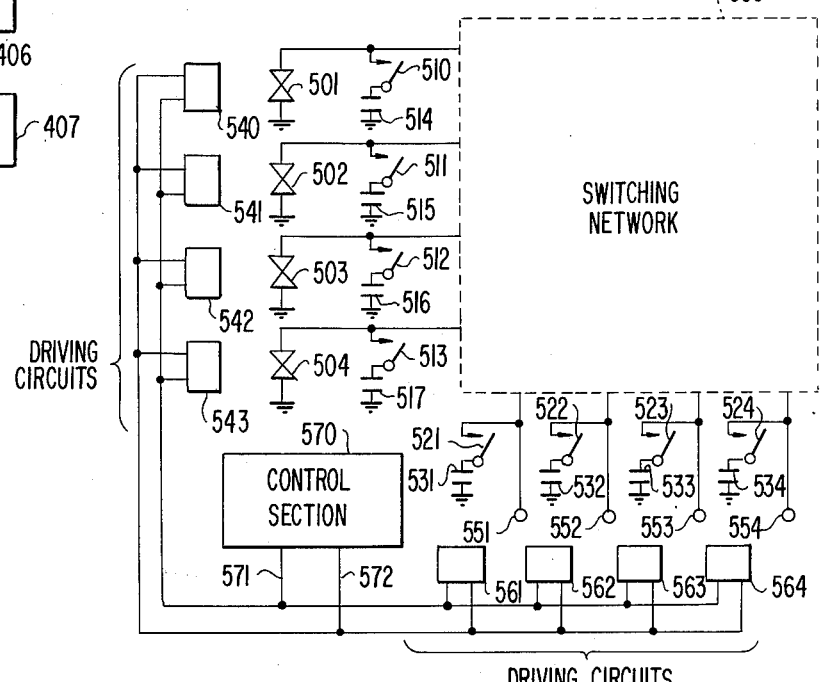
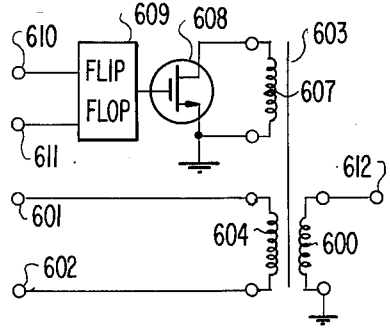
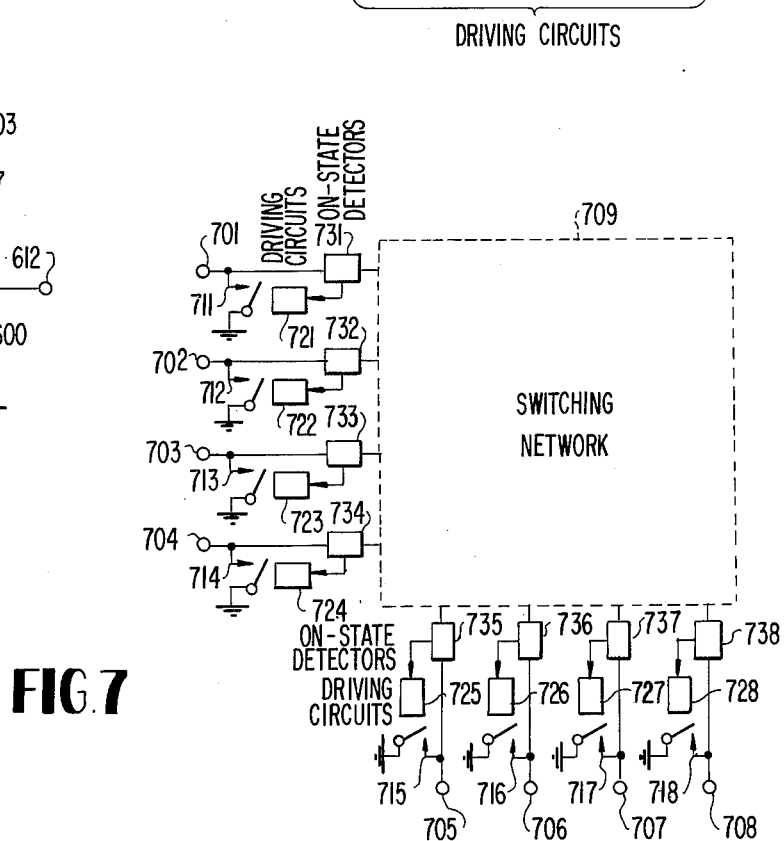

SWITCHING NETWORK WITH CROSSTALK ELIMINATION CAPABILITY

BACKGROUND OF THE INVENTION

The present invention relates to a switching network with crosstalk elimination capability for use in a crossbar and/or electronic telephone/data exchange systems.

In telephone/data exchange systems, crosstalk caused by a switching network has a great adverse effect upon performance of the exchange. For this reason, various methods for reducing the crosstalk are proposed. For instance, such crosstalk is caused on speech paths through switching elements such as relays or electronic crosspoints and wiring capacitance elements. The crosstalk further causes a disturbance to other speech paths as intelligible crosstalk or unintelligible noise. The smaller the crosstalk becomes, the smaller is the disturbance. However, in the large-scale switching network, the disturbance becomes greater by the accumulation of the crosstalk, which is mainly due to switch capacitance elements of the switching elements, wiring capacitance elements and the like associated with unused incoming lines which are not connected to subscribers as spare incoming lines for the purpose of maintenance and unused outgoing lines which are disconnected from trunk circuits as spare outgoing lines because of traffic carrying capacity and economic reasons.

However, usually, the proportion of those unused incoming lines and outgoing lines as compared with total numbers of incoming lines and outgoing lines, respectively, of a switching network is small because of efficient use and economical use of the exchange. So, crosstalk caused by these unused incoming and outgoing lines is trifling. Rather, in a state where subscribers, links and trunk circuits are physically connected to the switching network, crosstalk due to switch and wiring capacitance elements associated with idle incoming and outgoing lines has a greatly adverse effect upon the switching network. Especially, such crosstalk occurs when semiconductor elements such as MOSFET's are employed as switching elements.

One typical switching network employing MOSFET's as switching elements is disclosed in an article by Bächle et al. entitled "Fully Electronic Space-Division Telephone Exchanges using Semiconductor Crosspoints and Optical Switching," *IEEE Transactions on Communications*, Vol. COM-22, No. 9, pp 1286-1291 (particularly FIG. 2 on page 1288) September, 1974.

SUMMARY OF THE INVENTION

It is, therefore, an object of the present invention to provide a switching network capable of eliminating the aforementioned crosstalk caused by switch capacitance elements and wiring capacitance elements associated with unused and idle incoming and outgoing lines.

The present switching network with crosstalk elimination capability comprises a group of incoming lines connected to subscribers, a group of outgoing lines intersecting said incoming line group, a plurality of switching elements provided at preselected crosspoints formed between these incoming lines and outgoing lines for interconnecting a desired incoming line in said incoming line group and a desired outgoing line in said outgoing line group in response to a call from a subscriber and means for grounding idle and unused incoming lines and/or idle and unusued outgoing lines through impedance elements having a sufficiently low impedance value at a desired frequency band of signals to be exchanged.

Here, the technical term "a sufficiently low impedance value" means a sufficiently low impedance value for the impedance of the switching network. For instance, in a conventional telephone exchange, it means an impedance value of less than several ohms deemed to be a sufficiently low impedance for 600 ohms. Accordingly, even if not grounded directly, it may be grounded through an impedance element having a sufficiently low impedance at a frequency band exchanged by the switching network. As a result, this permits effective indirect grounding through a transformer or grounding through a capacitance element.

BRIEF DESCRIPTION OF THE DRAWINGS

Now the present invention will be described in detail in conjunction with the accompanying drawings, in which:

FIG. 4 shows a schematic diagram of one example of grounding circuits used in the present invention;

FIG. 5 shows a diagram of one embodiment of the present invention;

FIG. 6 shows one example of grounding circuits employing a transformer;

FIG. 7 shows diagram of a second embodiment of the present invention;

DESCRIPTION OF THE PREFERRED EMBODIMENTS

Figure 1:
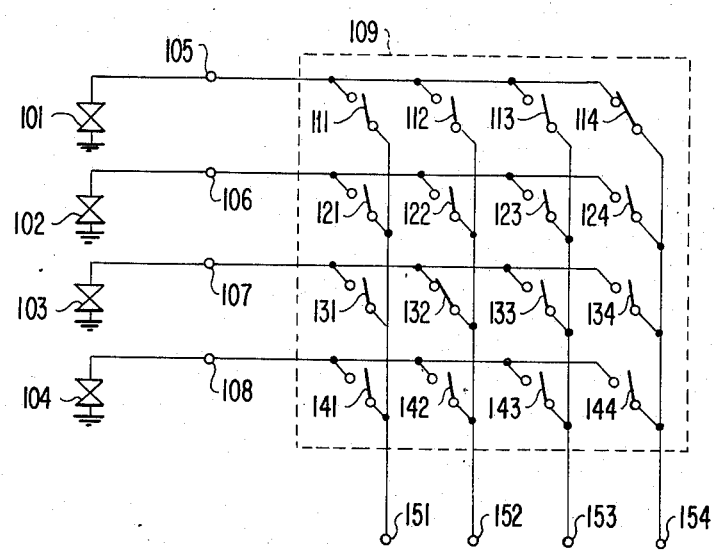
FIG. 1 shows a schematic diagram of one example of switching networks.

In FIG. 1, a group of switching elements in a switching network 109 connected to subscribers are shown. The switching network 109 includes input terminals 105, 106, 107 and 108, and telephone sets 101, 102, 103, and 104 are connected to these respective input terminals. The circuit 109 also includes output terminals 151, 152, 153 and 154 and is connected through these output terminals to links (not shown and connected to the next switching network) or trunk circuits (not shown). Switching elements 111 ~ 114, 121 ~ 124, 131 ~ 134 and 141 ~ 144 are provided at crosspoints between the input terminal group and the output terminal group. In this example, it is assumed that the telephone sets 101 and 103 operate to close crosspoints 114 and 132 and output signals appear at the output terminals 154 and 152.

Figure 2:
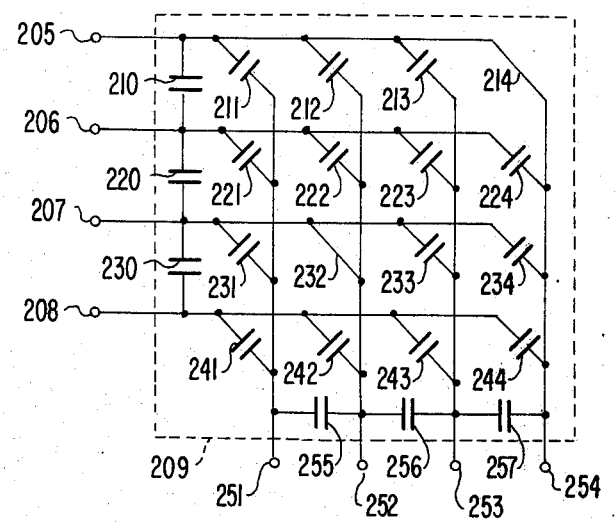
FIG. 2 shows a diagram of an equivalent circuit of the network shown in FIG. 1.

The circuit equivalent to the network of FIG. 1 in the operated state is represented by a dash line box 209 in FIG. 2. Input terminals 205, 206, 207 and 208 correspond to the input terminals 105, 106, 107 and 108, respectively, in FIG. 1, while output terminals 251, 252, 253, and 254 correspond to the output terminals 151, 152, 153 and 154 in FIG. 1. Crosstalk is mainly caused by capacitive elements comprising wiring capacitance elements formed between wires 210, 220, 230, 255, 256 and 257, and switch capacitance elements formed of opened switching elements 211 ∼ 213, 221 ∼ 224, 231, 233 234 and 241 ∼ 244. In this network, a speech signal is transmitted from the input terminal 205 to the output terminal 254 through the switching element 214, and also, another speech signal is sent from the input terminal 207 to the output terminal 252 through the switching element 232. Basically, crosstalk should not arise between the lines through which these two signals are transmitted, but nevertheless, crosstalk occurs through many complicated routes including capacitance elements 210, 220, 221, 222, 223 and 224 connected to the idle input terminal 206 and capacitance elements 256, 257, 243 and 233 connected to the idle output terminal 253.

Figure 3:
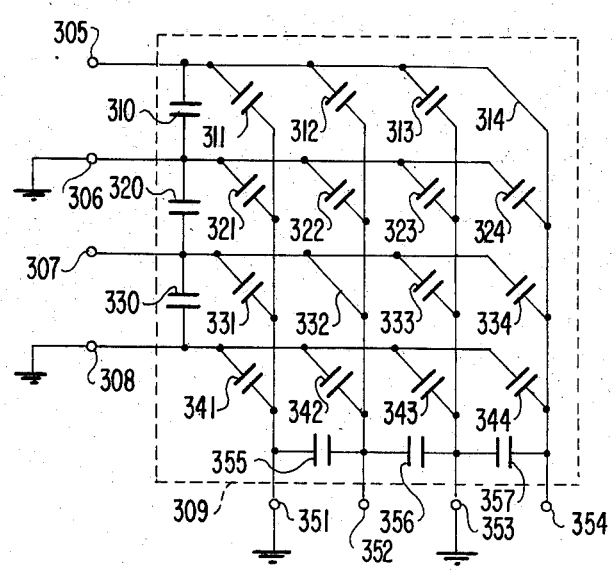
FIG. 3 shows a diagram of an equivalent circuit for illustrating the principle of the present invention.

In order to avoid the influence of these idle lines, it is necessary to ground idle input terminals 306 and 308 and idle output terminals 351 and 353 as shown in FIG. 3, and to release their grounding when they are busy. With regard to the technical effects of the grounding, explanation will be made in more detail referring to FIG. 3.

Input terminals 305 ∼ 308 and output terminals 351 ∼ 354 correspond to the input terminals 205 ∼ 208 and the output terminals 251 ∼ 254, respectively, in FIG. 2. In addition, capacitance elements 310 ∼ 313, 320 ∼ 324, 330, 331, 333, 334, 341 ∼ 344 and 355 ∼ 357, respectively correspond to the capacitance elements designated by similar numerals having the 200 series of FIG. 2. Assuming that the switching network of FIG. 3 carries out the same operation as that of FIG. 2, by grounding the input terminals 306 and 308 and the output terminals 351 and 353, the above-described crosstalk can be reduced. More particularly, upon grounding of the terminal 306, the wiring capacitance element 310 and 320 and the capacitance elements formed of the opened switching elements 321, 322, 323 and 324 connected to the terminal 306 are grounded at one end. As a result, crosstalk caused between the line extending from the input terminal 305 to the output terminal 354 and the line extending from the input terminal 307 to the output terminal 352 is reduced by the amount of the crosstalk components caused by these capacitance elements 321 ∼ 324, 310 and 320. Similarly, in response to the grounding to the input terminal 308, crosstalk is reduced by the amount of the crosstalk components caused by the capacitance elements 330, 341, 342, 343 and 344. Likewise, by the grounding of the output terminals 351 and 353, crosstalk associated with the capacitance elements 355, 356, 357, 311, 331, 313 and 333 can be eliminated. The above-mentioned grounding may be performed directly or indirectly through an impedance element having a sufficiently low impedance value for the circuit impedance to be grounded. In other words, the grounding may be made through a capacitance element or through a transformer in such a manner that the secondary winding of the transformer is grounded and its primary winding is connected between the input or output terminal and the ground. The feature of the present invention is found in a control section to release the grounding of each idle line when the line becomes busy and to ground the idle lines so that crosstalk may be reduced.

In FIG. 4 which shows a circuit with a relay for grounding an idle line, a line 401 is connected to an input terminal or an output terminal. Reference numeral 402 designates a relay contact for grounding, and reference numeral 403 designates a coil of the relay for actuating this contact. Reference numeral 404 designates an electronic circuit for controlling a current flowing through the coil 403, which responds to a control signal from a control section 407 received at a set terminal 405 for passing the current through the coil 403 to close the contact 402 and to ground the line 401, and which responds to another control signal from the control unit 407 received at a reset terminal 406 for interrupting the current flowing through the coil 403 to open the contact 402. Since the control section 407 controls the switching network, the above-described grounding operation is performed for only idle lines, reducing crosstalk efficiently.

FIG. 5 shows one embodiment of the present invention. In order to prevent the short-circuiting of a power supply caused by directly inserting relay contacts 510 ∼ 513 for grounding into incoming lines which feed currents to subscriber's telephone sets 501 ∼ 504, these lines are grounded through capacitance elements 514 ∼ 517. The capacitance of these elements is more favorable if it is larger. However, since normally a 600 ohm system is employed for telephone exchange, crosstalk can be reduced even with a capacitance of about several microfarads to several ten microfarads. A switching network 509 corresponds to the networks 109 and 209, respectively, in FIGS. 1 and 2. Outgoing lines of this network 509 having output terminals 551 ∼ 554 are also provided with relay contacts 521 ∼ 524 similarly to the incoming line side so that the outgoing lines may be grounded through capacitance elements 531 ∼ 534. The relay contacts 510 ∼ 513 are operated by driving circuits 540 ∼ 543 each of which is constructed integrally by the coil 403 and the electronic circuit 404 of FIG. 4. Similarly, the relay contacts 521 ∼ 524 are controlled by driving circuits 561 ∼ 564. Here, a control section 570 is adapted to detect the idle state of the respective subscriber's telephone sets 501 ∼ 504 and the outgoing lines 551 ∼ 554, and in response to the results of detection, it transmits control signals to the driving circuits 540 ∼ 543 and 561 ∼ 564 either through a set signal terminal 571 or through a reset signal terminal 572, whereby the grounding of incoming lines or outgoing lines in the idle state is carried out.

In FIG. 6 which shows one example of the grounding circuits, the incoming and outgoing lines of FIG. 5 are grounded through a transformer and a field effect transistor (FET), and an unbalanced line is used for the incoming line or the outgoing line. In the busy state, a speech signal given to a primary winding 604 of a transformer 603 through balanced lines 601 and 602 is transmitted from a secondary winding 600 through an unbalanced line 612 to the network of FIG. 5. When the line 612 serving as an incoming or an outgoing line of the circuit 509 is idle, it is grounded through the secondary winding 600 and a tertiary winding 607 of the transformer 603 by the FET 608. The FET 608 is controlled by a driving circuit (more particularly, a flip-flop 609) which operates in response to the control signals sent from the control section 570 of FIG. 5 to a set terminal 610 and to a reset terminal 611.

For instance, upon receipt of a set signal at the set terminal 610, the short circuit is formed between the drain and the source electrodes of the FET 608 so as to ground the unbalanced line 612. Or else, upon receipt of a reset signal at the reset terminal 611, the short circuit formed between the drain and the source electrodes of the FET 608 is released with the result of the release of the line 612 from the grounding. In this way, the above-described crosstalk is reduced in the circuit shown in FIG. 5.

In FIG. 7 which shows a second embodiment of the present invention, input terminals 701, 702, 703 and 704 connected to subscribers (or links) are connected to a switching network 709 through ON-state detectors 731, 732, 733, and 734, respectively, for detecting the busy state of each incoming line in response to voltage or current variation. Similarly, output terminals 705, 706, 707, and 708 connected to trunk circuits (or links) are connected to the network 709 through ON-state detectors 735, 736, 737 and 738, respectively.

The respective incoming and outgoing lines are interconnected through the switching network in response to calls from the subscribers. Electronic circuits 721, 722, 723, 724, 725, 726, 727 and 728 have relay windings fo driving relay contacts 711, 712, 713, 714, 715, 716, 717, and 718, respectively, for grounding said incoming and outgoing lines. When each incoming line or outgoing line is idle, the corresponding electronic circuit receives an output signal from the corresponding one of the detectors 731 ~ 738 to drive the corresponding one of the relay contacts 711 ~ 718. As a result, the corresponding incoming line or outgoing line is grounded so that crosstalk components caused by the switch capacitance elements and wiring capacitance elements associated with the idle incoming or outgoing line can be eliminated.

Figure 8:
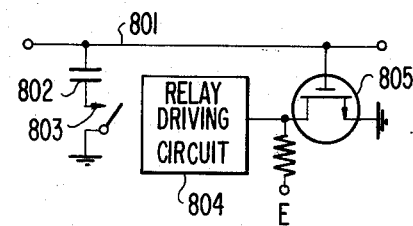
FIG. 8 shows a diagram illustrating a part of the network in FIG. 7.

The circuit shown in FIG. 8 is adapted to detect voltage variation in an incoming line (or outgoing line) of FIG. 7 and to perform grounding in response to the results of detection. In this circuit, an FET is employed as the detector 731 (or 735) in FIG. 7. The potential of an incoming line 801 corresponding to the incoming line connected to the input terminal 701 of FIG. 7 is continuously applied to the gate of an FET 805. As a result, if the incoming line 801 is busy, the drain electrode of the FET 805 is maintained substantially equal to the potential of a power supply means E. For this reason, a current does not pass through a relay winding in a relay driving circuit 804 (corresponding to the electronic circuit 721 of FIG. 7) so as to keep a contact 803 opened. In response to the change of the incoming line 801 to the idle state, the gate potential of the FET 805 changes to establish a flow of drain current between the source and the drain electrodes of the FET. Consequently, the drain current flows through the relay winding in the relay driving circuit 804 to close the relay contact 803 and thus the grounding of the idle incoming line 801 is performed. Here, a capacitance element 802 is employed to prevent the short-circuiting of a power supply means to the ground potential. As described previously, the capacitance of this element is more favorable for lowering the impedance value if it is larger, but as a practical matter, taking both economics and the space factor of the capacitance element into consideration, about several microfarads to several tens of microfarads may be appropriately selected as the capacitance.

Figure 9:
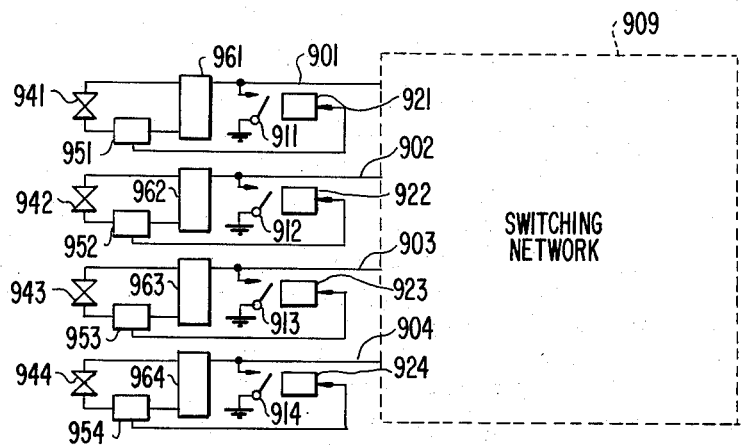
FIG. 9 shows a diagram of a third embodiment of the present invention.

In the case where electronic crosspoints such as transistors or diodes are employed for the switching elements in the switching network 709 of FIG. 7, subscriber line circuits 961, 962, 963 and 964 are inserted between subscribers 941, 942, 943, and 944 and incoming lines 901, 902, 903 and 904 of a switching network 909, respectively, as shown in FIG. 9. These subscriber line circuits provide power supply for the subscribers 941 ~ 944 and D.C. (direct current) isolation for preventing a direct current from flowing between the incoming lines 901 ~ 904 and the subscribers 941 ~ 944. In such a case, a ringing tone or warning tone for an OFF-hook (hereinafter called "howler tone") is often transmitted directly from the respective subscriber line circuits 961 ~ 964 to the subscribers 941 ~ 944 rather than through the switching elements of the switching network 909 because of the high voltage level of said both tones. Therefore, in the case where the grounding of each incoming line is carried out in response to the output signals of the detectors 731 ~ 734 for detecting the ON-state of the switching elements of the network 709 as shown in FIG. 7, by transmitting the howler tone, the corresponding subscriber is grounded irrespective of its OFF-hook state. This is due to the fact that the corresponding switching elements of the network 709 are in the OFF-state. Consequently, the output signal of a howler tone source is grounded through a low impedance. As a result, this makes transmission of the howler tone to the subscribers impossible.

To avoid such disadvantages, the network illustrated in FIG. 9 performs the grounding of each incoming line by using OFF-hook detectors 951, 952, 953 and 954 connected to subscribers 941 ~ 944 in place of said ON-state detectors. Due to this, reduction of crosstalk and transmission of the howler tone are made possible. In this structure, when subscribers 941 ~ 944 receive ringing tones from subscriber line circuits 961 ~ 964 upon terminating call, each subscriber is not in the OFF-hook state. Consequently, the grounding circuits operate. However, in general, a transformer capable of coupling only the frequency band of signals to be exchanged is used in the D.C. isolating circuit of FIG. 10 included in each subscriber line circuit, and as the ringing tone, a frequency lower than said frequency band is employed. So, actually, no disadvantage is found in the ringing tone transmission operation. In addition, reference numerals 921 ~ 924 of FIG. 9 designate electronic driving circuits for controlling relay contacts 911 ~ 914, respectively.

Figure 10:
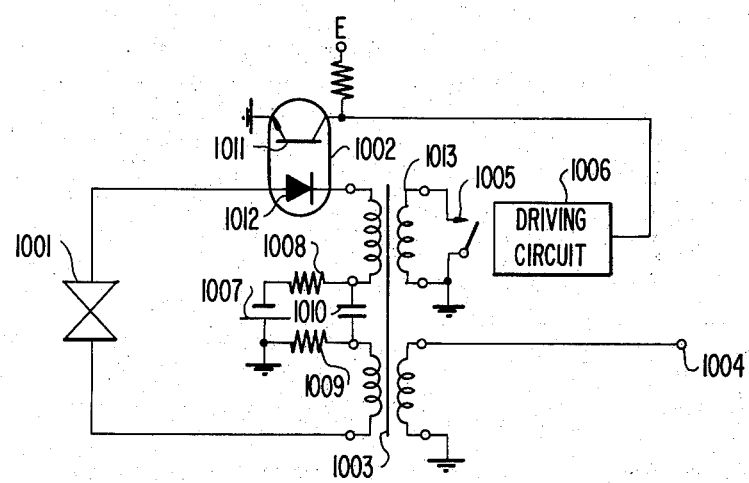
FIG. 10 shows a diagram showing a part of the network in FIG. 9.

A part of the network of FIG. 9 for grounding an incoming line 901 through a transformer is shown in FIG. 10. In this figure, a transformer 1003 is employed in the subscriber line circuit 961 of FIG. 9 and as the OFF-hook detector 951 of FIG. 9, a photo-coupler 1002 (optically-coupled isolator) consisting of a light-emitting diode 1012 and a photo-transistor 1011 is employed. A subscriber 1001 is connected to an incoming line 1004 of a switching network through a D.C. isolating transformer 1003 for preventing a direct current from flowing between the incoming line 1004 and the subscriber 1001, and this incoming line 1004 is grounded by a relay contact 1005 in a tertiary winding 1013 of the transformer 1003.

When the subscriber 1001 is in the OFF-hook state as is the case with speech signal transmission or howler tone transmission, a forward current flows through the light-emitting diode 1012 of the photo-coupler 1002 for detecting the OFF-hook state from a D.C. power supply means 1007 so that a current flows between the emitter and collector electrodes of the photo-transistor 1011. As a result, an input terminal of an electronic driving circuit 1006 is maintained at the zero potential to keep the relay contact 1005 opened. On the other hand, if a subscriber is in the ON-hook state, no current flows through the light-emitting diode 1012, and so, the collector electrode of the photo-transistor 1011 is maintained substantially at the potential of a power supply means E. Consequently, a current flows through the relay winding of the electronic driving circuit 1006 with the result that the relay contact 1005 is closed to achieve grounding of the tertiary winding 1013 and indirect grounding of the incoming line 1004. It is to be noted that in FIG. 10, reference numerals 1008 and 1009 designate resistors provided for restricting the current through the subscriber 1001 and reference numeral 1010 designates a capacitance element for blocking a D.C. and short-circuiting a voice signal current.

In the case where ringing tones to the subscribers 941 ∼ 944 are transmitted by the subscriber line circuits 961 ∼ 964 directly connected to the subscribers as shown in FIG. 9, sometimes ring-back tones for indicating that the called subscribers are being called are sent to the calling subscribers. This transmission of the ring-back tones is also carried out by the subscriber line circuits of the called subscribers. In other words, assuming that in FIG. 9, the subscriber 943 is a calling subscriber and the subscriber 941 is a called subscriber, the subscriber line circuit 961 supplies the ring-back tone to the calling subscriber 943 through the switching elements of the switching network 909 simultaneously with transmission of a ringing tone to the called subscriber 941. In such a case, if the grounding of the incoming lines 901 ∼ 904 is performed under the control of the OFF-hook detectors 951 ∼ 954 of FIG. 9, the grounding is done even upon transmission of the ringing tone. As a result, the ring-back tone is grounded via a low impedance, disabling its transmission to the calling subscriber.

Figure 11:
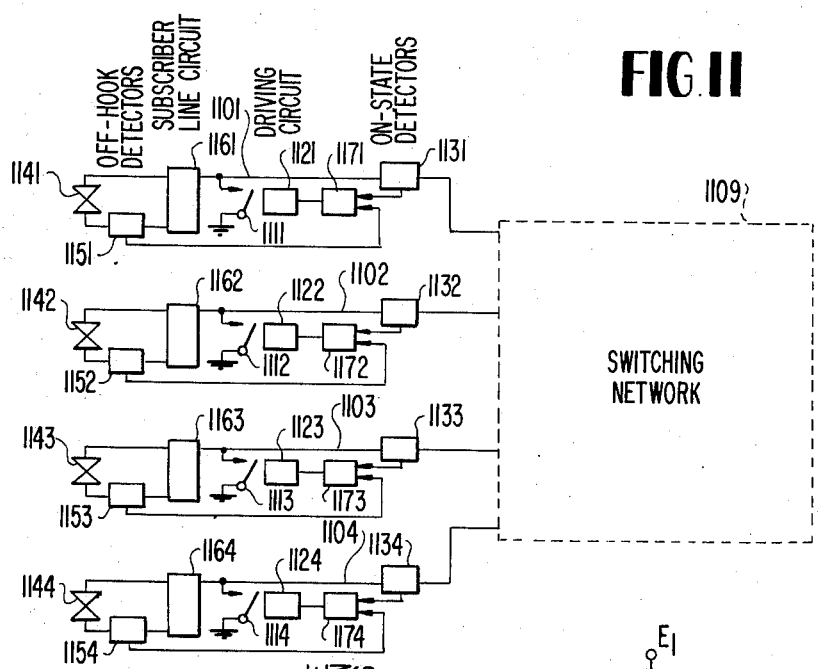
FIG. 11 shows a diagram of a fourth embodiment of the present invention.

In the network shown in FIG. 11, for the purpose of avoiding such a shortcoming, ON-state detectors 1131 ∼ 1134 for detecting the ON-state of the switching elements of the network 1109 are provided in respective incoming lines 1101 ∼ 1104. Also, according to the output signals of OFF-hook detectors 1151 ∼ 1154 connected to subscribers and the output signals of the ON-state detectors 1131 ∼ 1134, the state where both the subscriber and the corresponding incoming line are both idle can be identified by idle state decision circuits 1171 ∼ 1174. In response to the output signals of these decision circuits, the respective incoming lines are grounded, whereby in addition to the howler tone, the supply of the ring-back tone is also made possible. In FIG. 11, reference numerals 1161 ∼ 1164 designate subscriber line circuits for providing power supply for respective subscribers 1141 ∼ 1144, D.C. isolation for blocking a direct current flowing between the incoming lines 1101 ∼ 1104 and the subscribers 1141 ∼ 1144, and the supply of ringing tones and howler tones. Also, reference numberals 1121 ∼ 1124 designate electronic driving circuits for driving relay contacts 1111 ∼ 1114.

Figure 12:
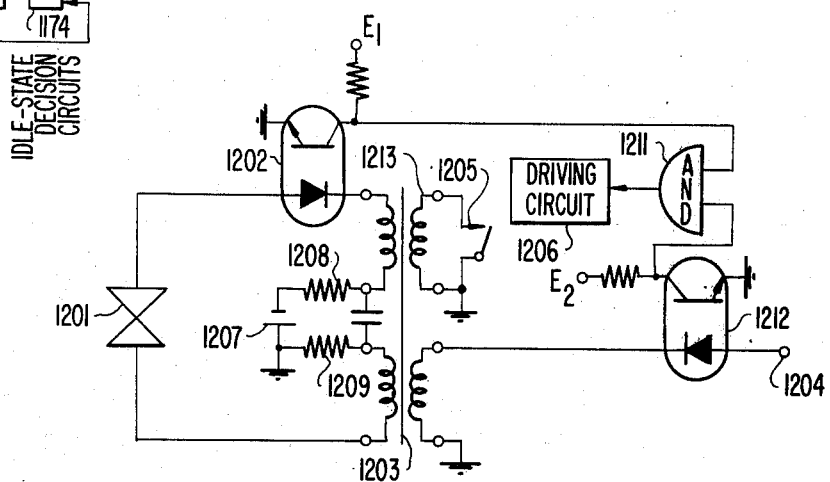
FIG. 12 shows a diagram showing a part of the network in FIG. 11.

A part of the network of FIG. 11 is shown in FIG. 12. Thus, the incoming line 1101 is grounded through a transformer. In FIG. 12, a transformer 1203 is employed in the subscriber line circuit 1161 of FIG. 11. Also, photo-couplers 1202 and 1212 are employed in the detector 1151 and the detector 1131, respectively, and an AND circuit 1211 is employed as the circuit 1171 of FIG. 11. A subscriber 1201 is connected to an incoming line 1204 of a switching network through a D.C. isolating transformer 1203 for preventing a direct current from flowing between the incoming line 1204 and the subscriber 1201, and this incoming line 1204 is grounded by a relay contact 1205 in a tertiary winding 1213 of the transformer 1203. Upon transmission of a howler tone, since the handset of the subscriber's set is in the OFF-hook state and the associated switching elements in the switching network 1109 are in the OFF-hook state, a forward current flows only through a light-emitting diode in a photo-coupler 1202 for detecting the OFF-hook state. Upon transmission of the ringing tone, while the handset of the called subscriber's set is in the ON-hook state, the associated switching elements in the network 1109 are in the ON-state for transmitting the ring-back tone to the calling subscriber. As a result, a forward current flows only through the light-emitting diode in the photo-coupler 1212. Also, during speech signal transmission, both the subscriber 1201 and the incoming line 1204 are busy so that forward currents flow through the light-emitting diodes in both photo-couplers 1202 and 1212. As a result, the two input terminals of the AND circuit 1211 receive the collector potential or potentials of the photo-couplers 1202 and/or 1212 depending upon whether it is during speech signal transmission, during transmission of the howler tone or during transmission of the ringing tone. However, in the above three states, since a low level potential is given to at least one of the two input terminals of the AND circuit 1211, a low level potential always appears at the output terminal of the AND circuit 1211, and owing to this output signal, the relay contact 1205 is kept opened. On the other hand, in case where both the subscriber 1201 and the incoming line 1204 are idle, a forward current flows through the light-emitting diode of neither the photo-coupler 1202 nor 1212. As a result, the collector potentials of the two photo-transistors of the photo-couplers 1202 and 1212 are maintained at the potential of the power supply means $E_1$ and $E_2$, respectively, and consequently, are given to both the input terminals of the AND circuit 1211 so that a high level signal appears at the output terminal of said AND circuit. In response to this output signal, a current flows through a relay winding in the electronic driving circuit 1206 so as to close the relay contact 1205. Thus, reduction of crosstalk can be achieved.

In FIG. 12, reference numeral 1207 designates a power supply means for a subscriber's set, reference numerals 1208 and 1209 designate resistors for restricting a current flowing through the subscriber's set, and reference numeral 1210 designates a capacitance element for blocking a direct current.

In the above-described embodiments, even in the case where subscribers, links and trunk circuits are physically connected to the switching network, reduction of crosstalk is achieved by grounding incoming lines and/or outgoing lines when they are idle. However, in some cases, crosstalk is caused in the switching network by incoming lines not connected to subscribers as spare lines and by outgoing lines disconnected from the trunk circuits due to maintenance and economic reasons.

Figure 13:
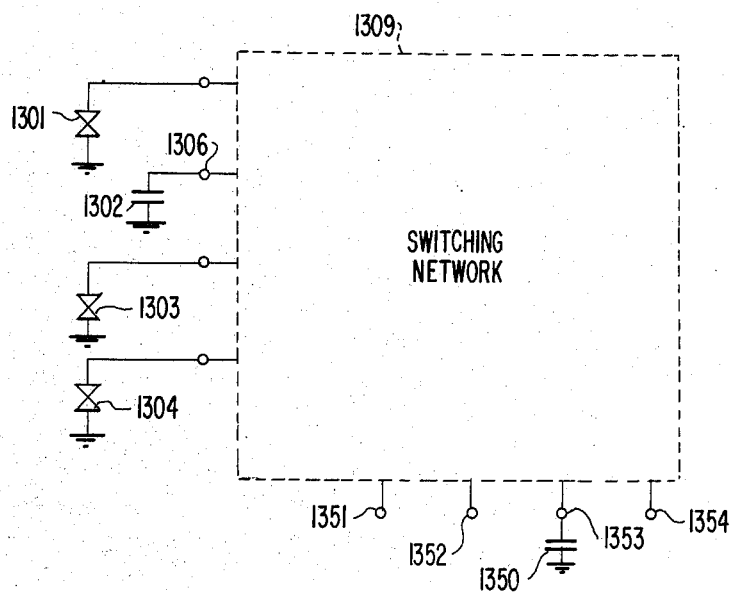
FIG. 13 shows a diagram of a fifth embodiment of the present invention.

FIG. 13 shows a fifth embodiment of the present invention in which crosstalk caused in the above-mentioned case is reduced. In this figure, the internal arrangement of a switching network 1309 is omitted from illustration, but its operation mode is similar to that shown in FIG. 1. Telephone sets 1301, 1303 and 1304 are connected to input terminals, while among output terminals, terminals 1351, 1352 and 1354 are used as connected to trunk circuits (or links). However, an input terminal 1306 and an output terminal 1353 are permanently unused. Capacitance elements 1302 and 1350 for grounding are connected to these unused input terminal 1306 and unused output terminal 1353, respectively. The capacitance of these elements are selected at such a large value that they show a sufficiently low impedance value at a desired frequency band of signals to be exchanged, and consequently, the unused lines are equivalently grounded through these capacitance elements. Thus, crosstalk is greatly reduced.

Although the invention has been described above in connection to the switching network having telephone sets connected to its input terminals for convenience of explanation, even in an intermediate stage network within a multi-stage switching network, the present invention is applicable by considering the above-described incoming and outgoing lines themselves as the incoming and outgoing lines of the intermediate stage and by deeming the above-described telephone sets as the outgoing lines from the preceding stage network. Also, various modifications and alternatives may be made within the scope of the present invention defined by the appended claims.

What is claimed:

1. A switching network comprising:
   a group of incoming lines connected to telephone subscribers;
   a group of outgoing lines intersecting said incoming line group;
   a plurality of switching elements provided at preselected crosspoints formed between these incoming lines and outgoing lines for interconnecting a desired incoming line in said incoming line group and a desired outgoing line in said outgoing line group in response to a call from a subscriber;
   a plurality of ON-state detectors connected to the respective incoming lines for detecting the ON-state of said switching elements in response to variation of current or voltage;
   a plurality of direct current isolating circuits connected to said respective incoming lines for preventing direct currents from flowing between the subscribers and said incoming lines;
   a plurality of OFF-hook detectors connected to these direct isolating circuits for detecting the OFF-hook state of the subscribers;
   a plurality of decision circuits responsive to output signals on said ON-state detectors and output signals of said OFF-hook detectors for determining the state where the subscribers are in the ON-hook state where each incoming line is idle; and
   a plurality of grounding means for grounding said incoming lines through impedance elements having a sufficiently low impedance value at a desired frequency band of signals to be exchanged when the output signals of said decision circuits show that the subscribers are in the ON-hook state and each said incoming line is idle.

2. A switching network as claimed in claim 1, wherein said plurality of switching elements consists of semiconductor elements.

3. A switching network as claimed in claim 1, wherein said direct current isolating circuits each comprise a transformer having primary and secondary windings, a balanced line being connected to said primary winding and an unbalanced winding being connected to said secondary winding with said balanced line and said unbalanced line forming a part of an incoming or outgoing line; and said means for grounding idle and unused incoming lines and/or outgoing lines comprises a tertiary winding on said transformer and means for controllably shortcircuiting said tertiary winding to ground.

4. A switching network as claimed in claim 3, wherein each of said OFF-hook detectors comprises a first photo-coupler connected in said balanced line and each of said ON-state detectors comprises a second photo-coupler connected in said unbalanced line, and each of said decision circuits consists of an AND gate receiving as inputs and outputs of said first and second photo-couplers and providing an output to said means for controllably shortcircuiting said tertiary winding.

5. A switching network as claimed in claim 4, further comprising a D.C. power supply means connected to said primary winding.

6. A switching network as claimed in claim 5, wherein said primary winding is divided into two halves, said D.C. power supply means is connected between said two halves and a capacitance element is connected in shunt with said D.C. power supply means, said capacitance element having a low impedance value at the desired frequency band of signals to be exchanged.

* * * * *